No. 787,891. PATENTED APR. 25, 1905.
C. E. CASTLE.
MECHANIC'S FOLDING PLUMB AND LEVEL.
APPLICATION FILED MAR. 28, 1904.
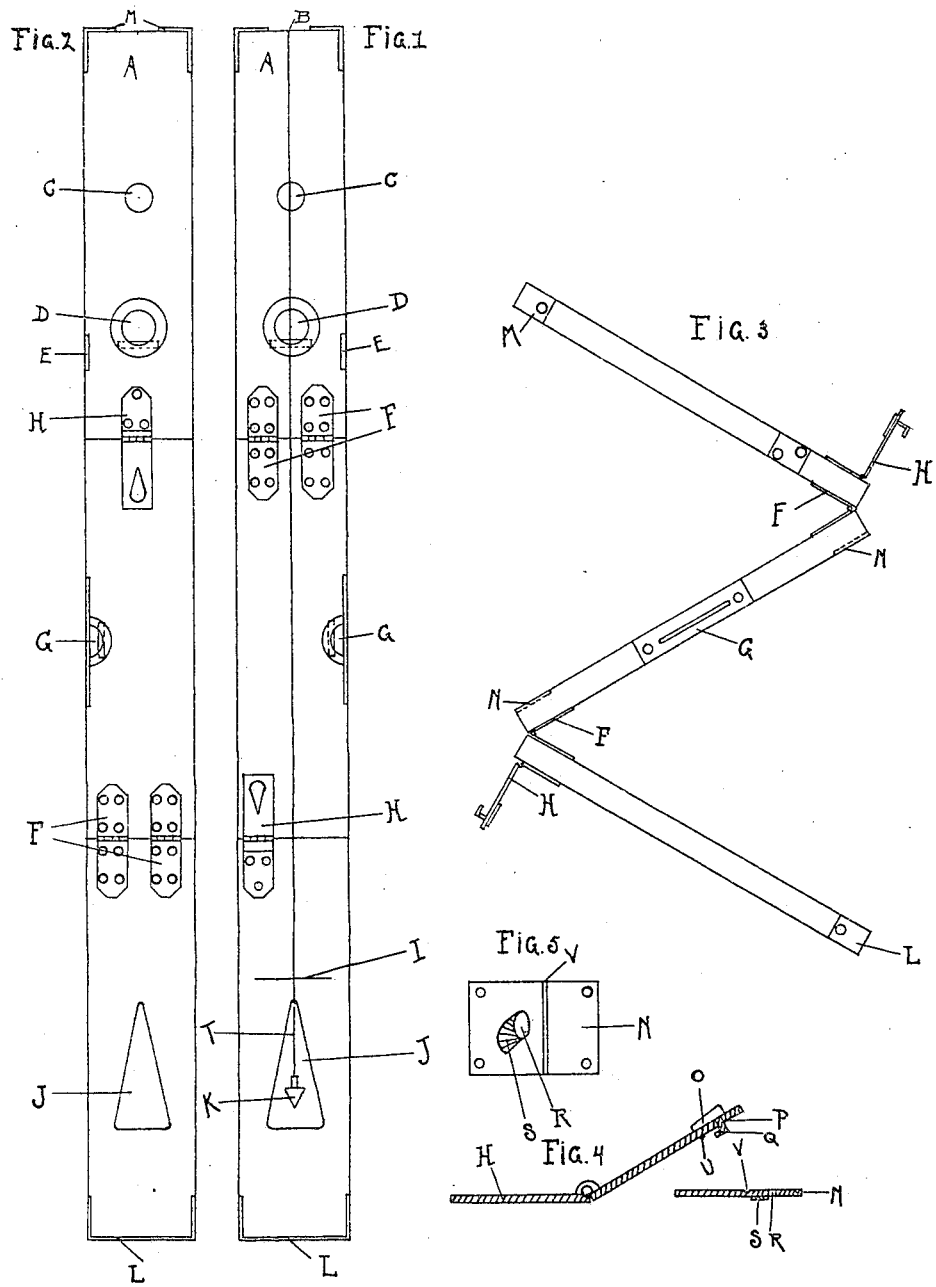
WITNESSES:
INVENTOR
Clarence Edmund Castle No. 787,891.

Patented April 25, 1905.

UNITED STATES PATENT OFFICE.

CLARENCE EDMOND CASTLE, OF OGDENSBURG, NEW YORK.

MECHANIC'S FOLDING PLUMB AND LEVEL.

SPECIFICATION forming part of Letters Patent No. 787,891, dated April 25, 1905.

Application filed March 28, 1904. Serial No. 200,491.

*To all whom it may concern:*

Be it known that I, CLARENCE EDMOND CASTLE, a citizen of the United States, residing at Ogdensburg, in the county of St. Lawrence and State of New York, have invented a new and useful Mechanic's Folding Plumb and Level, of which the following is a specification.

My invention relates to improvements in a mechanic's plumb and level; and the objects of my improvements are to combine in one implement the plumb and spirit-level and the weighted plumb-cord and at the same time to furnish means for easily folding the implement into small compass, so that it may be carried in the ordinary tool-bag used by masons and artisans. These objects I attain by the means illustrated in the accompanying drawings, in which—

Figure 1 is a plan view of the face of the complete implement in working order. Fig. 2 is a plan view of the back thereof. Fig. 3 is a side view of the said implement partially folded for packing away. Fig. 4 is an enlarged sectional side view of the hinged locking-plate H and keeper thereof, and Fig. 5 is a separate view of bottom of said keeper.

Referring now to said drawings, in which similar letters refer to similar parts throughout the several views, A represents the body of said implement, which is preferably made of some light close-grained wood and is in three sections of about equal length, with their sides and ends accurately jointed at right angles, so that when extended and locked in operative position the edge to be used next to the work may be a continuous straight line and parallel to the plumb-line hereinafter described. The upper and lower ends of the implement may be armed with sheet-metal guards M and L, respectively, as in the ordinary carpenter's level, to protect said ends from wear and keep the corners square. It may also be provided with the aperture C near its top end for the purpose of hanging up the implement when not in use. Near the lower end of the upper section of said implement is placed the plumb spirit-level tube E, with the sight-hole D, both constructed in the usual manner for such purposes, and midway of the central section and on one of its working edges is inserted the ordinary spirit-level tube G, plate, and sight-hole, as customarily used. Through the lower portion of the bottom section of said implement is made the aperture J, of any convenient form to permit the proper working of the plumb-bob or weight K. This weight K is attached to a cord T, which is led under the bridge or line gage I and over the surface of the implement and along the plumb-line marked on such surface parallel to the working edge of the implement, and said cord is fastened in a slot B at the upper end of said plumb-line in the usual manner, as by making a knot on the unweighted end of said cord and drawing the cord through said slot B from rear forward until such knot catches against the rear edges of said slot. The middle and top sections of said implement are securely fastened together by the metal fast-joint hinges F F, which may be inserted and riveted to the material of said implement or attached thereto by screws in the ordinary manner of hinges, and the middle and lower sections of said implement are fastened together in a similar manner by the fast-joint hinges F F, secured to the reverse face of said implement, so as to permit the said lower section to be folded against one face of said middle section and the said upper section to be folded against the reverse face of said middle section, as shown at Fig. 3.

For the purpose of holding said implement rigidly extended when in use I provide the metal fast-hinged catch H, which comprises the stationary plate H proper, which is securely attached by screws or other suitable means to the end section of said implement on the side opposite the hinge-joint hereinbefore described, with its hasp portion extending over the middle section of said implement, said hasp portion hinged thereto, as shown, and carrying near its free end a turn-button which consists of the finger-piece O, the cylindrical shank P, revolubly held in said hasp-piece, and the latch Q, adapted to fit into the aperture R in the keeper-plate N and engage with the spiral cone S on the under side thereof, and the said keeper-plate N, which is firmly secured to the middle section of said implement by screws or other suitable means in such position that when said implement is fully extended and latched, said turn-button may be rotated to coincide with the aperture R and engage the spiral surface of the cam S, so as to hold the said sections firmly and prevent any movement thereof relative to each other. On the under side of said hasp-piece is formed a transverse rib U in such position as to coincide with and fill the groove V on the upper surface of the keeper-plate N. When it is desired to pack away the said implement for transportation, the said turn-buttons are rotated until released from their locked position, the hasp portion turned back, so as to free it from the keeper-plate, and the said sections of the implement turned back on their hinges until their surfaces come together, meanwhile the plumb-bob being held in position within the aperture J. The implement can then be carried in the ordinary tool-bag in common use by mechanics. When again extended and locked by the means shown, it can be used as is the ordinary mechanic's plumb and level combined in one implement.

It is obvious that other forms of hinges and locks than those shown may be employed to perform the functions above described. I therefore do not wish to limit myself to the particular form of either as herein shown; but What I do claim as my invention, and desire to secure by Letters Patent of the United States, is—

1. The combination with a folding staff consisting of a plurality of members, of a detachable plumb bob and cord; a spirit plumb-tube inserted near one end of said staff; a spirit-level tube inserted in one edge of the middle part of said staff; metal hinges secured alternately upon the opposite faces of said staff at the several joints thereof respectively and so as to permit the extension of the said several members of said staff to form a continuous straight line and allow free play to said plumb-cord; a locking-latch located at each of said joints and on the face of said staff opposite to each of said hinges respectively, and comprising an apertured plate adapted to be secured to one of the members of said staff and carrying a transverse groove on its outer face, and on its reverse face and near the aperture therein a spiral cam, and a hinged plate adapted to be secured to an adjoining member of said staff and carrying on its free part a transverse rib adapted to register with the groove in said apertured plate and a rotatable key adapted to pass through the aperture in said first-described plate and when rotated engage the said cam; and means for attaching said tubes, hinges and plates to the appropriate members of said staff, substantially in the manner shown and described.

2. The combination with a folding staff consisting of a plurality of members, of a detachable plumb bob and cord; a spirit-level tube inserted in one edge of the middle part of said staff; metal hinges secured alternately upon the opposite faces of said staff at the several joints thereof respectively and so as to permit the extension of said several members of said staff to form a continuous straight line and allow free play to said plumb-cord; a locking-latch located at each of said joints and on the face of said staff opposite to each of said hinges respectively, and comprising an apertured plate adapted to be secured to one of the members of said staff and carrying a transverse groove on its outer face, and on its reverse face and near the aperture therein a spiral cam, and a hinged plate adapted to be secured to an adjoining member of said staff and carrying on its free part a transverse rib adapted to register with the groove in said apertured plate and a rotatable key adapted to pass through the aperture in said first-described plate and when rotated engage the said cam; and means for attaching said tube, hinges and plates to the appropriate members of said staff, substantially in the manner shown and described.

3. The combination with a folding staff consisting of a plurality of members, of a detachable plumb bob and cord; metal hinges secured alternately upon the opposite faces of said staff at the several joints thereof respectively and so as to permit the extension of the said several members of said staff to form a continuous straight line and allow free play to said plumb-cord; a locking-latch located at each of said joints and on the face of said staff opposite to each of said hinges respectively, and comprising an apertured plate adapted to be secured to one of the members of said staff and carrying a transverse groove on its outer face, and on its reverse face and near the aperture therein a spiral cam, and a hinged plate adapted to be secured to an adjoining member of said staff and carrying on its free part a transverse rib adapted to register with the groove in said apertured plate and a rotatable key adapted to pass through the aperture in said first-described plate and when rotated engage the said cam; and means for attaching said hinges and plates to the appropriate members of said staff, substantially in the manner shown and described.

4. The combination with a folding staff consisting of a plurality of members, of a spirit plumb-tube inserted near one end of said staff; a spirit-level tube inserted in one edge of the middle part of said staff; metal hinges secured alternately upon the opposite faces of said staff at the several joints thereof respectively and so as to permit the extension of the said several members of said staff to form a continuous straight line; a locking-latch located at each of said joints and on the face of said staff opposite to each of said hinges respectively, and comprising an apertured plate adapted to be secured to one of the members of said staff and carrying a transverse groove on its outer face, and on its reverse face and near the aperture therein a spiral cam, and a hinged plate adapted to be secured to an adjoining member of said staff and carrying on its free part a transverse rib adapted to register with the groove in said apertured plate and a rotatable key adapted to pass through the aperture in said first-described plate and when rotated engage the said cam; and means for attaching said tubes, hinges and plates to the appropriate members of said staff, substantially in the manner shown and described.

In testimony whereof I have signed my name to this specification in the presence of two subscribing witnesses.

CLARENCE EDMOND CASTLE.

Witnesses:
ANNIE E. FIELD,
FRED J. GRAY.